United States Patent [19]

Lemercier

[11] 4,216,059
[45] Aug. 5, 1980

[54] PROTECTIVE DEVICE FOR A VESSEL SUSPENDED OF A NUCLEAR REACTOR

[75] Inventor: Guy Lemercier, Le Puy Sainte Reparade, France

[73] Assignee: Commissariat a l'Energie Atomique, Paris, France

[21] Appl. No.: 873,078

[22] Filed: Jan. 27, 1978

[30] Foreign Application Priority Data

Feb. 11, 1977 [FR] France ............................ 77 03930

[51] Int. Cl.$^2$ ............................................. G21C 11/08
[52] U.S. Cl. ........................................ 176/87; 176/38; 176/40
[58] Field of Search .................... 176/40, 65, 87, 38

[56] References Cited

U.S. PATENT DOCUMENTS

| | | | |
|---|---|---|---|
| 3,776,814 | 12/1973 | Lockett et al. | 176/87 |
| 3,933,182 | 1/1976 | Costes | 176/87 X |
| 4,022,657 | 5/1977 | Lemercier | 176/40 |
| 4,022,658 | 5/1977 | Gama et al. | 176/65 X |
| 4,028,177 | 6/1977 | Failla et al. | 176/65 X |
| 4,038,136 | 7/1977 | Gallet et al. | 176/87 |
| 4,055,464 | 10/1977 | Lemercier | 176/40X |
| 4,055,465 | 10/1977 | Lemercier | 176/65 X |
| 4,070,221 | 1/1978 | Anthony | 176/87 X |
| 4,087,325 | 5/1978 | Chevallier et al. | 176/65 |

Primary Examiner—Peter A. Nelson

[57] ABSTRACT

A protective device for a vessel suspended beneath the closing plate of a nuclear reactor in which the wall of the vessel is covered in the vicinity of its connection to the plate towards the inside of the vessel by a metal heat insulating structure constituted by at least one layer of juxtaposed panels. Each of the panels is formed by two parallel cover plates between which is located a layer of thin superimposed metal members. The connection between the cover plates is provided by pins which are perpendicular to the plane of the plates fixed at one end to one of the plates and screwed at the opposite end to a nut which bears against the other plate, thus compressing the layer. The edges of the cover plates of two adjacent panels in the structure are separated by a gap. The layer of thin metal members located between the plates of one panel projects laterally beyond the outline of the latter so as to engage between the plates of at least one adjacent panel while filling the gap. The thin metal members of each layer are staggered with partial overlapping from one member to the next. The heat insulating structure is supported by a plurality of angle irons, each of which has a lateral ferrule constituting one of the two cover plates of each panel, applied against the inner wall of the vessel and a lower supporting flange for the insulating panels.

7 Claims, 5 Drawing Figures

PROTECTIVE DEVICE FOR A VESSEL SUSPENDED OF A NUCLEAR REACTOR

BACKGROUND OF THE INVENTION

The present invention relates to nuclear reactors having a suspended vessel and applies more particularly to a reactor of the fast neutron type in which the core or active part of the reactor is located in the vessel and immersed in a suitable volume of a circulating liquid metal which ensures its cooling by the extraction of calories given off by nuclear fission in the fuel assemblies forming the core.

The general concept of a "reactor block" of the above type is completely standard in the art, more particularly in the so-called integrated design where the vessel containing the liquid metal which has a generally cylindrical configuration with a substantially spherical base is open in the upper part and is suspended with its vertical axis below an upper protective plate which seals the vessel and ensures the protection of the external environment. The plate rests by its periphery on a bearing surface provided in a generally concrete thick-walled caisson which defines a cavity which receives the vessel. In this solution the plate also supports a system of rotary plugs disposed vertically relative to the core and carrying means permitting access to be obtained to the latter in order to ensure the inspection and handling of the fuel assemblies, a system of heat exchangers and circulating pumps distributed around the core and after traversing the plate immersed in the volume of liquid metal contained in the vessel. On leaving the core the hot liquid metal passes through the exchangers where it gives off the calories taken up and once cooled is taken up again in the vessel by pumps which return it under an adequate pressure to below the core for a further passage through the latter.

It is readily apparent that in a design of this type a critical part of the installation is the area in which the upper part of the cylindrical ferrule of the vessel is anchored in the plate. In particular this area must be protected relative to the thermal flux created by liquid metal aerosols from the vessel and also relative to too high temperature gradients and too sudden variations in said gradients which are liable to occur in operation or on stopping the reactor.

The invention relates more particularly to providing against the inner wall of the vessel in the vicinity of the area in which it is fixed to the plate of a continuous heat insulating structure which effectively satisfies the above requirements, said structure being designed in such a way that it can be applied to the wall of the vessel without being fixed thereto by welding or other connecting means liable to destroy the mechanical integrity of the vessel and its strength.

BRIEF SUMMARY OF THE INVENTION

The problem of the invention is to define a heat insulating structure whose continuity is ensured in a reliable manner over a long period of time, despite the differential thermal expansions resulting from heat cycles inherent in the operation of the reactor.

To this end the invention relates to a protective device for a vessel suspended below a closing plate of a nuclear reactor in which in the area of its connection to the plate the vessel wall is covered towards the inside of the vessel by a metal heat insulating structure constituted by at least one layer of juxtaposed panels, each being formed by two parallel covering plates between which is arranged a layer of thin superimposed metal members, the connection between the covering plates being ensured by pins which are perpendicular to the plane of said plates fixed at one end to one of the plates and screwed at the opposite end onto a nut supported on the other plate whilst compressing the layer, wherein the edges of the covering plates of two adjacent panels in the structure are separated by a gap and wherein the layer of thin metal members mounted between the plates of one panel laterally projects beyond the outline of the latter so as to engage between the plates of at least one adjacent panel whilst filling the gap, the thin metal members of each layer being themselves staggered relative to one another with partial overlapping between one member and the next, the heat insulating structure being supported by a plurality of angle irons each of which has a lateral ferrule constituting one of the two covering plates of each heat insulating panel applied against the inner wall of the vessel and a lower supporting flange for the two heat insulating panels.

According to a special feature of the invention the layer of thin metal members positioned between the covering plates is formed by superimposing corrugated or undulating sheets in such a way that their superimposition defines a system of small substantially closed and insulating volumes through the thickness of the layer. According to another variant the thin metal members are formed by superimposed metal gauzes or nettings, which are optionally separated in the thickness of the layer by thin sheets.

According to a special embodiment of the invention the lower flange is welded to a baffle parallel to the vessel wall and defines with the latter a space in which circulates an appropriate flow of liquid cooling metal.

BRIEF DESCRIPTION OF THE DRAWINGS

Other features of the device according to the invention in connection with a suspended vessel equipped in its connecting area with the closing plate with a heat insulating structure can be gathered from the following description of an exemplified embodiment given in an indicative and non-limitative manner with reference to the attached drawings, wherein show.

DETAILED DESCRIPTION OF THE PREFERRED EMBODIMENTS

Figure 1:
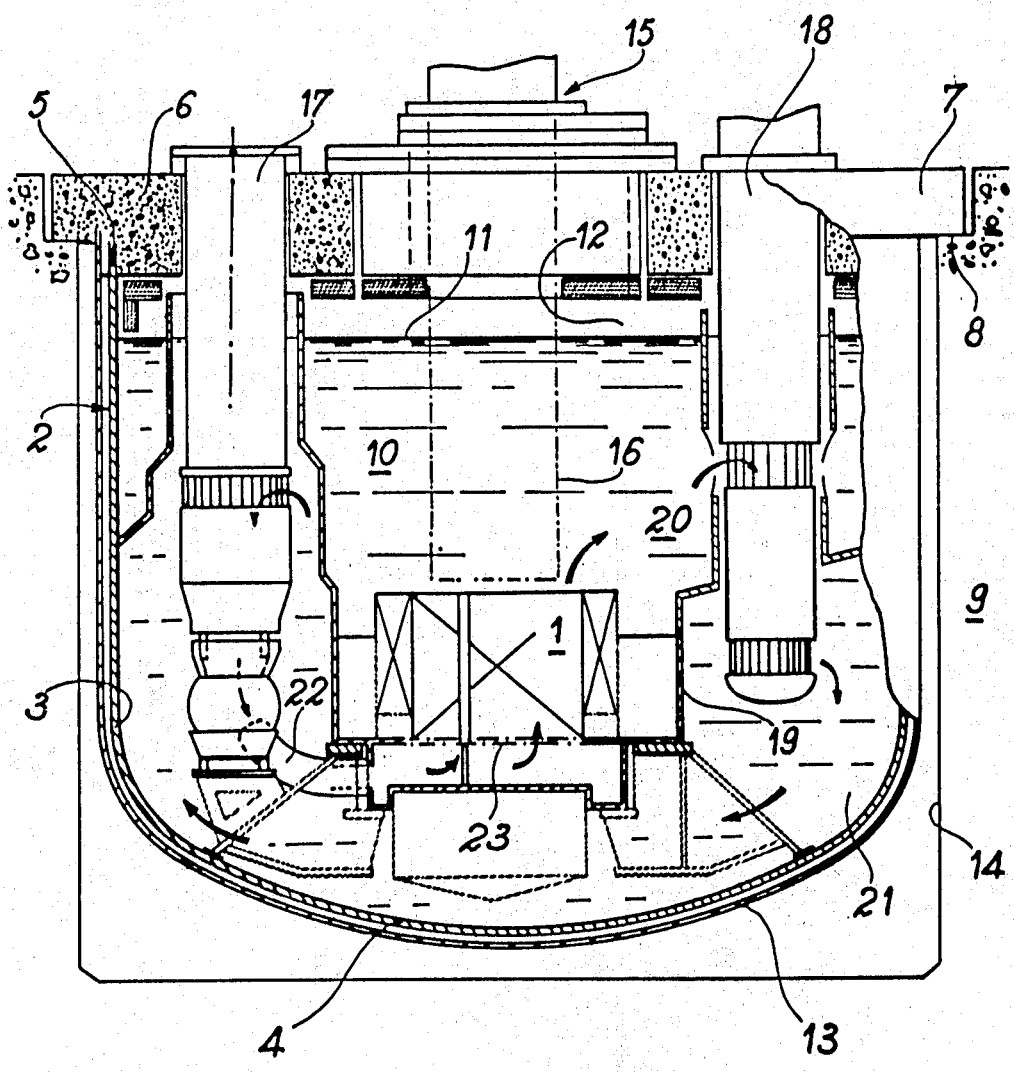
FIG. 1 A diagrammatic cross-sectional view of a fast neutron reactor having a vessel suspended by its upper part beneath a closing plate.

In FIG. 1 reference numeral 1 designates the core of a nuclear reactor, particularly of the fast neutron type, which it is not necessary to describe in detail here. Core 1 is located within a vessel 2, called the main vessel, having in particular a cylindrical lateral ferrule 3 with a vertical axis and a lower generally spherical base 4. At its upper end 5 ferrule 3 is fixed and suspended beneath a horizontal plate 6 of considerable thickness which closes the vessel, whereby said plate 6 has on its periphery a shoulder 7 which rests on a corresponding bearing surface 8 of a concrete caisson 9 surrounding the reactor. Vessel 2 contains an appropriate volume of liquid metal, generally sodium in which is immersed the core 1. The upper level 11 of the sodium volume in the vessel is itself surmounted beneath the plate 6 by an atmosphere 12 of inert gas, in general argon. In addition, vessel 2 is externally duplicated by a second parallel-walled vessel 13, called the safety vessel, which in the case of an accident in the main vessel 2 prevents the sodium contained in the latter from spreading, more particularly to within the cavity 14 in caisson 9 and in which is located the assembly formed by vessels 2 and 13.

The horizontal plate 6 closing the upper part of the main vessel has in known manner substantially to the right of core 1 a system of rotary plugs 15 giving access to inspection, control and handling devices, diagrammatically indicated by reference numeral 16 and positioned below the rotary plugs 15 to the core 1 and which are then able to carry out the operations necessary for the functioning or maintenance of said core. In addition, plate 6 supports circulating pump 17 and heat exchangers 18 permitting the soidum 10 to circulate within vessel 2, said means being distributed in vessel 2 below the level 11 of sodium 10 contained therein. More particularly core 1 is arranged within a supplementary or inner vessel 9 which, in the main vessel 2, defines two separate regions, respectively 20 and 21, the hot sodium leaving the core and which on traversing the latter has absorbed the calories given off by the nuclear fission is taken up by exchangers 18 and when cooled on leaving the latter in region 21 is sucked up by pump 17 to be returned by pipes 22 having a large cross-section into a support 23 which supports core 1 in order to ensure a further passage through the latter.

Figure 2:
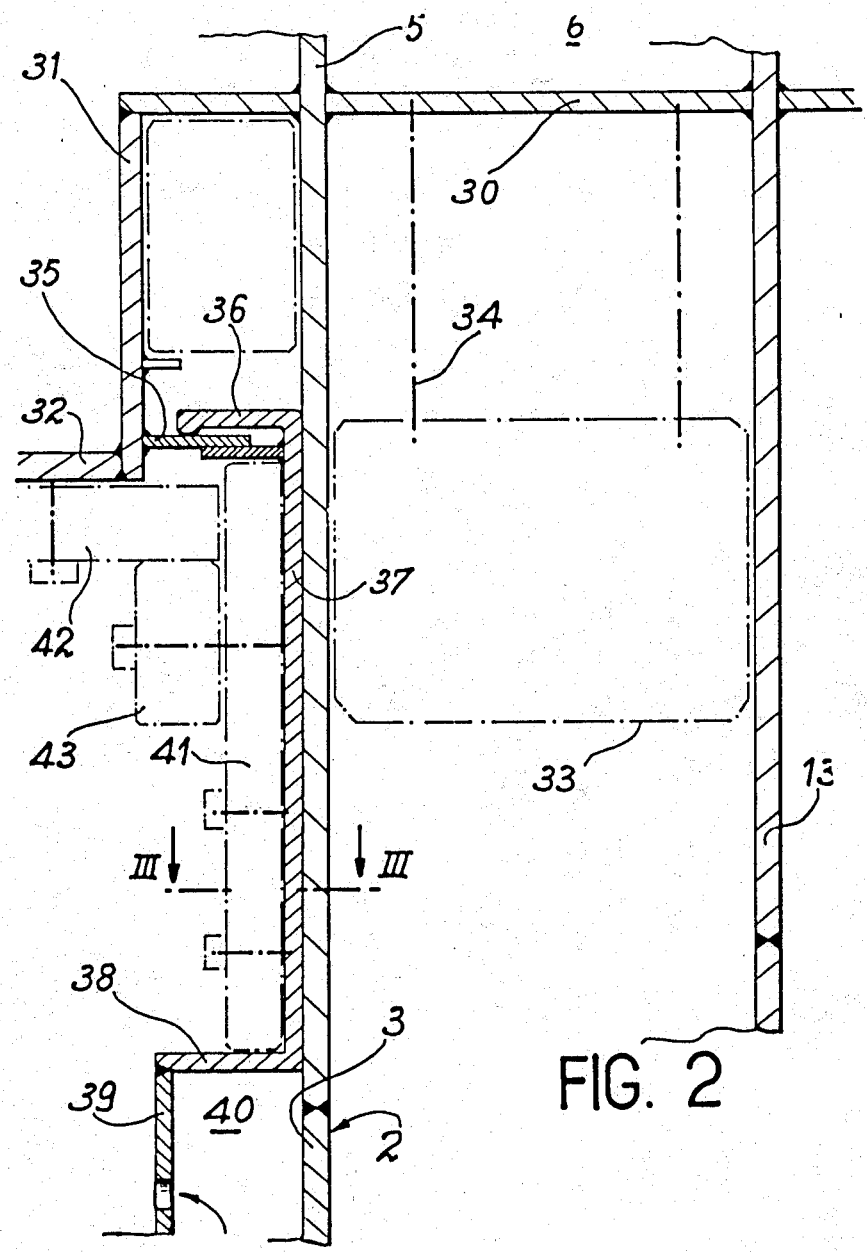
FIG. 2 A larger scale detail of the connection area of the vessel to the plate and to the associated heat insulating structure.

FIG. 2 is a larger scale detailed view of the construction of the upper part 5 of cylindrical ferrule 3 of vessel 2, notably in the area where it is fixed to plate 6 and also shows the upper portion of the safety vessel 13 which duplicates the first vessel. Plate 6 is canned by a metal base plate 30 traversed by the upper part 5 of ferrule 3. Base plate 30 is extended beneath the plate 6 by a skirt 31, which is itself continued by a horizontal plate 32. A heat insulating structure 33, whose construction has little influence on the invention, is advantageously positioned between vessels 2 and 13, said structure 33 being supported by suspension ties 34.

In order to ensure according to an essential arrangement of the invention the thermal protection of the inner wall of the upper end 5 of ferrule 3 skirt 31 which is integral with the lower face of plate 6 has in the represented embodiment a supporting ring 35 on which rests the upper edges such as 36 of a plurality of juxtaposed angle irons such as 37 which extend parallel to vessel 2. Each angle iron 37 supports protective members, details of which will be given hereinafter, which rest on a lower supporting flange 38 of the angle iron, advantageously fixed to the end of a baffle 39 parallel to the wall of vessel 2 and defining with the latter an intermediate space 40 in which circulates a convenient flow of liquid sodium ensuring the cooling of the vessel when the reactor is operating.

The heat insulating structure 41 placed against the angle iron 37 supported against the lower flange 38 of the latter is constituted by a series of adjacent juxtaposed panels. The effect of this structure is completed by other insulating assemblies such as 42 fixed beneath the lower plate portion 32 of plate 6 and such as 43 fixed to the angle iron 37.

Figure 3:
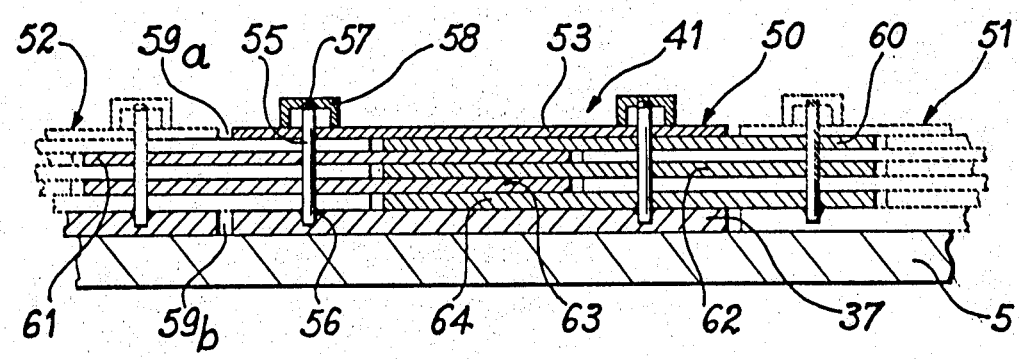
FIG. 3 A view on an even larger scale of a detail of the heat insulating structure in accordance with a section III—III of FIG. 2.

FIG. 3 illustrates on a still larger scale a constructional detail of the heat insulating structure applied to angle iron 37. This structure is formed by a series of adjacent panels, for example 50, 51 and 52 which are juxtaposed against the angle iron 37. In the present embodiment each of these panels comprises a cover plate 53 which is parallel to the inner surface of angle iron 37. The latter, which at the same time serves as a second cover plate has pins 55 extending perpendicular to its plane and welded at 56. At the opposite end said pins have a threaded portion 57 co-operating with a nut 58 which bears against the opposite face of cover plate 53 in such a way as to bring together plate 53 and angle iron 37, by gripping between them an elastic insulating layer mounted in the structure. This elastic layer is more particularly formed by superimposing several thin metal members 60, 61, 62, 63 and 64, advantageously constituted by undulating or corrugated plates or metal gauzes or nettings extending parallel to the plane of cover plate 53.

According to a special feature of the invention the cover plates 53 in two adjacent panels, for example panels 50 and 51 or 50 and 52 define by their lateral edges a gap 59a. In the same way the angle irons 37 of two adjacent panels 50 and 51 or 50 and 52 define by their lateral edges a gap 59b. These gaps are filled by the thin metal members 60 to 64 which to this end project beyond the visible outline of the corresponding panels and cover plates by extending transversely from one panel to the next. The thin members 60 to 64 of each panel are themselves staggered from one member to the next in such a way as to ensure a partial mutual overlapping and extending transversely from one panel to the next, ensuring the continuity of the heat insulating structure over the entire surface area thereof, notwithstanding the separation of said structure in several independent adjacent panels.

In the embodiment described hereinbefore insulating panels 50, 51, 52, when applied against the angle irons 37, form a continuous layer or covering, whereby the cover plates 53 parallel to the angle irons are fixed to the latter by pins 55. As a variant the heat insulating structure can be constituted by several layers of the above type, the panels then having two parallel cover plates, whilst the last layer, adjacent to angle irons 37, only has a single plate as hereinbefore.

Figure 4:
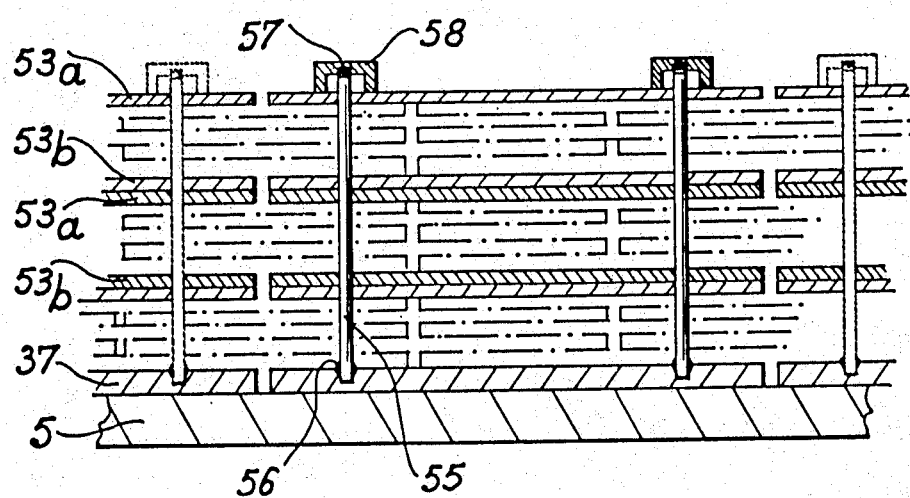
FIGS. 4 and 5 Two other assembly variants of the structure.
Figure 5:
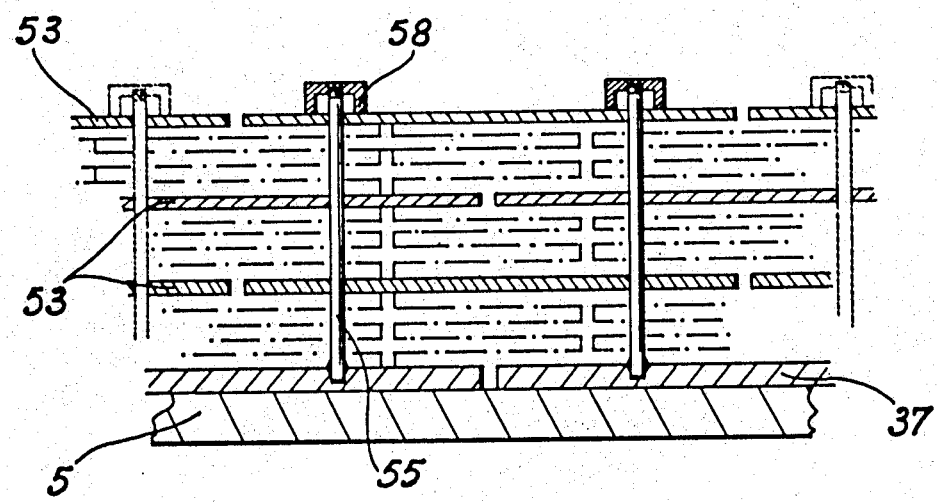

FIGS. 4 and 5 diagrammatically illustrate two further variants of this type where the cover plates in the successive panels are either superimposed (FIG. 4—plates 53a, 53b) or staggered (FIG. 5—plates 53). Each covering layer can thus have two plates as illustrated in FIG. 4 maintaining between them the thin metal members in the manner described hereinbefore or can be arranged so that the lower cover plate of each layer constitutes the upper cover plate of the following layer and so on (FIG. 5). The fixing pins 55 are able to traverse the complete stack of layers by being fixed to the lower angle iron 37, as in the preceding embodiment, and co-operating with the nuts 58 on the top of the upper cover plate of the final layer or can be distributed in the thickness of successive layers, the latter solution is not shown. In the latter case and when the cover plates are staggered it should be noted that the differential expansion can be absorbed by the clearances left between the pins and the plates due to a slight flexure of the former.

Thus, a protective device is obtained using a heat insulating structure of very simple design and whose continuity is particularly reliable, no matter what the differential thermal expansions which are liable to occur between these different members during the operation of the reactor, more particularly during the heat cycles to which the latter is subject. In particular the displacement obtained between each thin member, constituted by a corrugated or undulating sheet or a perforated metal gauze, provides an appropriate overlapping of the panels and a continuous structure over the entire surface to be protected. Moreover this flexible heat insulating structure has the advantage of being permanently placed against the wall of the main vessel 2, owing to the fact that the temperature of cover plates 53 is always higher than that of angle irons 37.

It is obvious that the invention is not limited to the embodiment described and represented hereinbefore. The invention in fact covers all possible variants. In particular it is possible to use any other equivalent positioning and supporting method for the panels of the heat insulating structure.

What is claimed is:

1. A protective device for a vessel suspended below a closing plate of a nuclear reactor in which in the area of its connection to the plate the vessel wall is covered towards the inside of the vessel by a metal heat insulating structure constituted by at least one layer of juxtaposed panels, each being formed by two parallel covering plates between which is arranged a layer of thin superimposed metal members, the connection between the covering plates being ensured by pins which are perpendicular to the plane of said plates fixed at one end to one of the plates and screwed at the opposite end onto a nut supported on the other plate whilst compressing the layer, wherein the edges of the covering plates of two adjacent panels in the structure are separated by a gap and wherein the layer of thin metal members mounted between the plates of one panel laterally projects beyond the outline of the latter so as to engage between the plates of at least one adjacent panel whilst filling the gap, the thin metal members of each layer being themselves staggered relative to one another with partial overlapping between one member and the next, the heat insulating structure being supported by a plurality of angle irons each of which has a lateral ferrule constituting one of the two covering plates of each heat insulating panel applied against the inner wall of the vessel and a lower supporting flange for the two heat insulating panels.

2. A device according to claim 1, wherein the layer of thin metal members located between the cover plates is formed by superimposing undulating sheets in such a way that their superimposition defines a system of small substantially closed and insulating volumes through the thickness of the layer.

3. A device according to claim 1, wherein the thin metal members are formed by superimposed metal nettings.

4. A device according to claim 1, wherein the lower supporting flange for the heat insulating panels is welded to a baffle which is parallel to the wall of the vessel and defines with the latter a space for the circulation of an appropriate flow of liquid cooling metal.

5. A device according to claim 1, wherein the heat insulating structure has a plurality of superimposed layers of juxtaposed panels, the plates covering the panels in the layers being themselves superimposed and staggered from one layer to the next.

6. A device according to claim 3, wherein the metal nettings are separated in the thickness of the layer by thin sheets.

7. A device according to claim 1, wherein the heat insulating structure has a plurality of superimposed layers of juxtaposed panels, the plates covering the panel in the layers being themselves staggered from one layer to the next.